Oct. 23, 1962  J. R. KIRK ET AL  3,059,942
ROLLING FUEL TANK UNITS OR THE LIKE
Filed Nov. 1, 1956  3 Sheets-Sheet 1

Inventors
Joseph R. Kirk
Seth G. Atwood
Atty

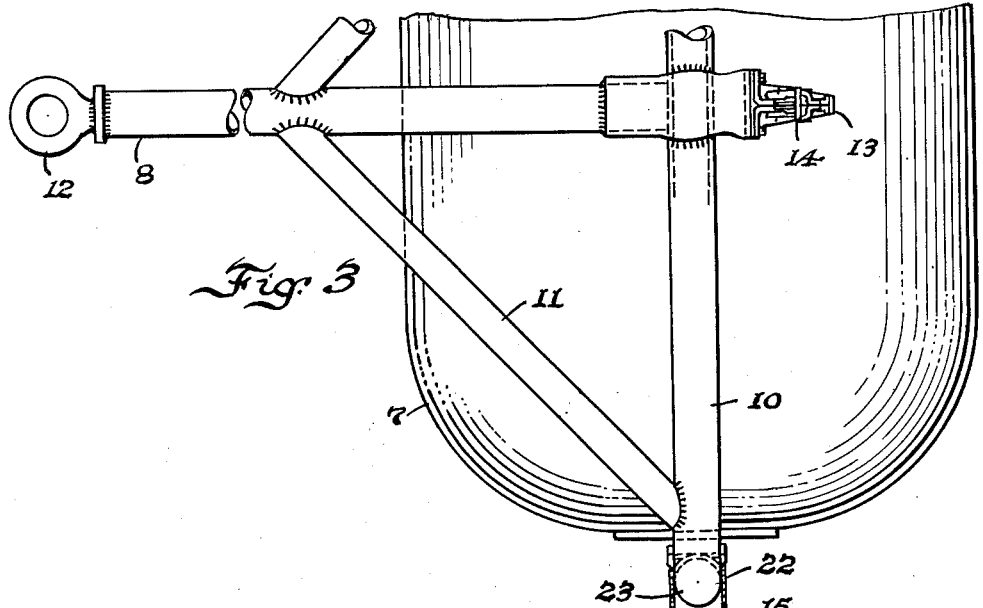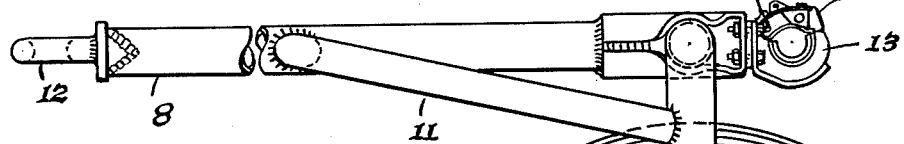

Oct. 23, 1962   J. R. KIRK ET AL   3,059,942
ROLLING FUEL TANK UNITS OR THE LIKE
Filed Nov. 1, 1956   3 Sheets-Sheet 3
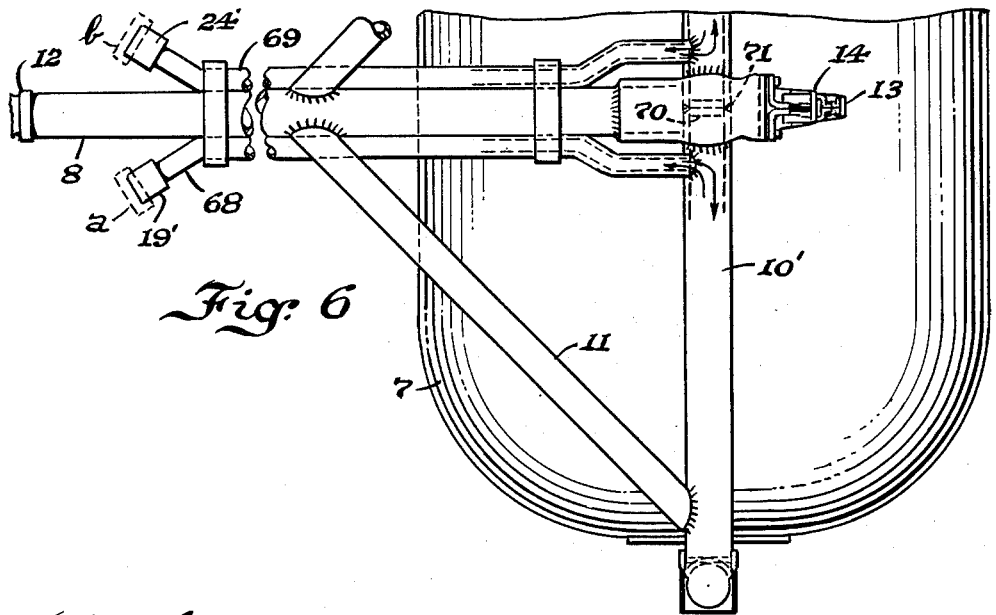
Fig. 6
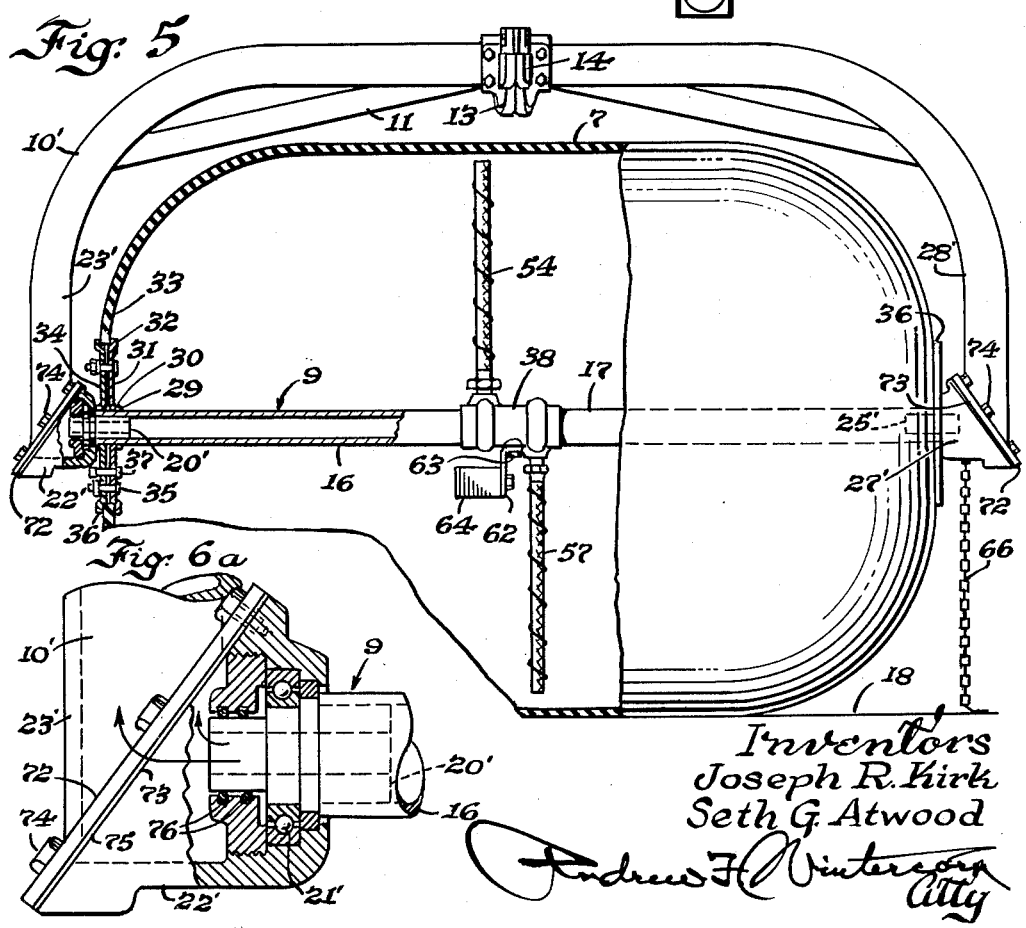
Fig. 5
Fig. 6a
Inventors
Joseph R. Kirk
Seth G. Atwood
Andrew H. Winters
Atty United States Patent Office 3,059,942
Patented Oct. 23, 1962

3,059,942
ROLLING FUEL TANK UNITS OR THE LIKE
Joseph R. Kirk and Seth G. Atwood, Rockford, Ill., assignors to Atwood Vacuum Machine Company, Rockford, Ill., a corporation of Illinois
Filed Nov. 1, 1956, Ser. No. 619,709
4 Claims. (Cl. 280—5)

This invention relates to rolling fuel tank units or the like and is more particularly concerned with improvements on the construction disclosed in Arpin Patent No. 2,548,190, issued April 10, 1951.

The principal object of our invention is to provide a more practical solution to the problems presented in the construction of a unit of the kind disclosed in said patent by simplifying the construction of the flexible walled combination tank and tire and reducing the cost thereof. Thus, for example, if the anti-friction bearings are located outside the tank and made completely independent of it the whole construction is greatly simplified and improved. Also, we have found that by making the hollow axle in two sections, designed to be inserted from opposite ends of the tank and connected together inside the tank at the middle thereof, where communication is established through a fitting swivelled on and held against endwise movement with respect to the two axle sections with two oppositely directed flexible hoses carried on the fitting for communication with the top and bottom of the tank, the filling and emptying of the tank can be accomplished much more easily and with far less complications in the general construction of the unit.

While quickly connectible and disconnectible couplings may be provided on the ends of the axle sections for the filling and emptying of the tank at its two ends, there are advantages to be gained by extending lines from these two points to a common point, as, for example, at some point on the draw-bar, and providing the couplings at these closely spaced ends of the lines. The two arms of the fork between which the tank operates are tubular and are preferably used as portions of these two lines, in accordance with our invention. This arrangement also enables withdrawing liquid from the tank while it is rolling, which widens the range of uses for such units considerably, making them suitable for use with mobile spraying equipment of all kinds, for example.

The invention is illustrated in the accompanying drawings, in which—

FIGS. 3 and 4 are a plan and side view of FIG. 1, respectively;

FIGS. 5 and 6 are views similar to FIGS. 1 and 3, respectively, showing a modified or alternative construction, and FIG. 6a is an enlargement of a portion of FIG. 5 to better illustrate the construction.

Similar reference numerals are applied to corresponding parts throughout the views.

Figure 2:
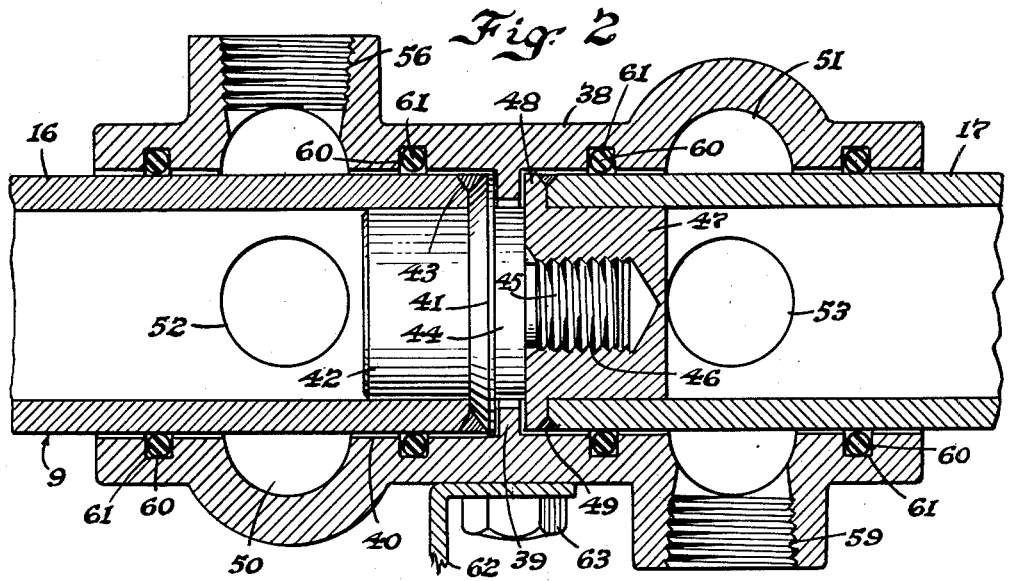
FIG. 2 is an enlarged sectional detail of the middle portion of the improved axle assembly of FIG. 1.

Referring to FIGS. 1 to 4, the reference numeral 7 designates a tank in the form of a large flexible walled body or balloon tire of rubber or other suitable resilient material and substantially cylindrical form in which gasoline or other fuel for the operation, for example, of army tanks and other military vehicles and airplanes can be transported over all kinds of roads and terrain with minimum pull on the draw-bar 8. The latter is connected to the opposite ends of an axle 9 by means of a U-frame or fork 10 provided on the rear end of the draw-bar 8.

The fork is suitably braced with respect to the draw-bar 8, as indicated at 11. A coupler eye 12 is provided on the front end of the draw-bar 8 and a hook type coupler 13 on the rear end for coupling engagement in an eye 12 on another trailing unit, so that a number of these rolling fuel tank units can be coupled together for towing. The vertical disposition of the U-frames 10 and the relatively high elevation of the draw-bars 8 together make for close-coupled relationship of the units so that more units may be run together in a single chain. The tanks 7 when emptied of fuel can be inflated and will, therefore, present no problem in returning the same to a supply depot for refilling. The coupler hook 13 has a keeper or locking arm 14 pivoted thereon, as at 15, and arranged to be locked releasably in either the closed position shown in FIG. 4 or a raised open position, as disclosed in Tierney Patent No. 2,426,532, whereby to facilitate coupling and uncoupling and reduce likelihood of accidental uncoupling.

In accordance with our invention, the axle 9 is made up of two separate tubular sections 16 and 17 that turn with the tank 7 in the rolling thereof on the ground or roadway indicated at 18, the section 16 being for the inlet and outlet of air, and the section 17 for the inlet and outlet of gasoline or other fuel, or for that matter any other liquid to be hauled, such as water. At 19 we have indicated a quickly disconnectible coupling communicating with axle section 16 through a hollow trunnion 20 suitably fixed in the outer end of the axle section 16 and received in a roller bearing 21 mounted on a housing 22 carried on the lower end of one arm 23 of the fork 10. In a similar manner, a quickly disconnectible coupling 24 is provided in connection with a trunnion 25 in the outer end of the other axle section 17 working in a roller bearing 26 mounted on a housing 27 on the lower end of the other arm 28 of the fork 10. Both of the axle sections 16 and 17 have their outer end portions welded, as indicated at 29, to the inwardly projecting annular flanges 30 on circular sheet metal plates 31 that have rim portions 32 abutting the inner side of the end walls 33 of the tire or tank 7. Companion outer plates 34 are fastened to plates 31 by means of studs 35 on plates 31 and nuts threaded thereon, and these companion plates have rim portions 36 cooperating with rim portions 32 on plates 31 to clamp the end walls of the tire and provide a liquid tight and air tight joint. 37 is an air valve of the well known type commonly used on tires by means of which the tank 7 can be inflated when emptied of fuel or other liquid and couplings 19 and 24 have been suitably capped to make them air-tight.

Figure 1:
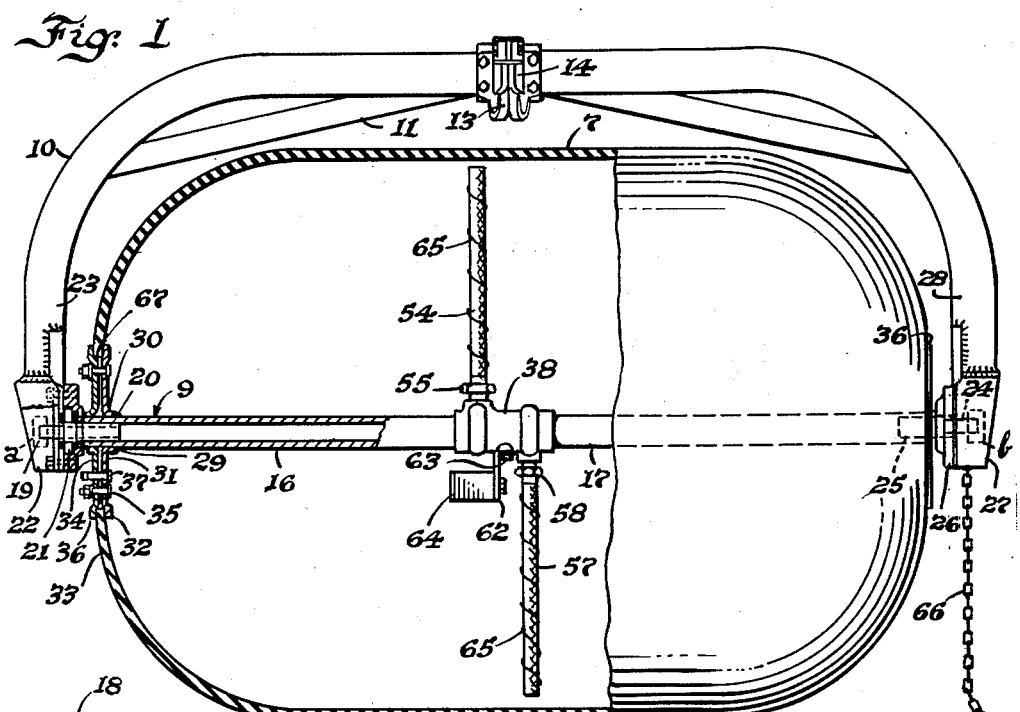
FIG. 1 is a rear view, partly in elevation and partly in vertical cross-section, of a rolling fuel tank unit incorporating the improvements of our invention.

A generally cylindrical fitting 38 is swivelled on and held against endwise movement relative to the coaxially aligned portions of the axle sections 16 and 17, as shown in FIG. 2. This fitting has an annular internal shoulder 39 provided in the middle of the bore 40 for abutment on one side by an annular flange 41 provided on a plug 42 having a press fit in the end of axle section 16 and welded thereto, as indicated at 43. The plug 42 has a reduced cylindrical extension 44 beyond and concentric with the flange 41 and on this extension is a further reduced threaded extension 45 on the axis of the plug which is threadedly received in a center hole 46 provided in another plug 47 that has a press fit in the inner end of axle section 17. Plug 47 has an annular flange 48 abutting the other side of the annular shoulder 39 and welded to the inner end of axle section 17, as shown at 49. Thus, fitting 38 is held against endwise movement with respect to the adjoining inner ends of the axle sections 16 and 17 and the latter are at the same time freely rotatable therein. The plugs 42 and 47 also serve as seals for the inner ends of the axle sections besides providing a means for rigidly interconnecting the adjoining inner ends of the axle sections to turn together as a unit. Annular chambers 50 and 51 are provided in the opposite end portions of the fitting 38 and have communication with radial holes 52 and 53, respectively, provided in the inner end portions of the axle sections 16 and 17. The chamber 50 has an upwardly extending flexible hose 54 connected, as indicated at 55, to neck 56 opening therefrom, and the chamber 51 communicates with a downwardly extending flexible hose 57 connected, as shown at 58, with neck 59 opening therefrom. Rubber O-rings 60 are provided in annular internal grooves 61 provided on opposite sides of both chambers 50 and 51 to seal the swivel joints against leakage. A bracket 62 fastened, as shown at 63, to the bottom of the fitting 38, carries a counterweight 64 which serves to hold the swivelled fitting 38 against turning with the axle 9 in the rolling of the tank 7, thereby maintaining the up and down relationship of hoses 54 and 57, shown in FIG. 1. The hoses 54 and 57 also have helical springs 65 thereon which tend to straighten them out so that they normally reach to the extreme top and bottom levels, respectively, as seen in FIG. 1. A metallic chain 66 is suspended from one of the housings 22 and 27 to the ground to serve as a static eliminator.

In operation, the rubber tire forming the tank 7 is "flat" like any deflated tire when the tank is empty, and, under such conditions, hose 57 will, of course, be flexed somewhat because the bottom of the tank is then closer to the axle 9. However, as the tank is filled with gasoline or other liquid through a hose attached to coupling 24, hose 57 will straighten out. The air displaced by the liquid in filling is discharged through hose 54, axle section 16, and coupling 19. Finally, when the liquid reaches the level of the upper end of the hose 54 and overflows through the hose 54, axle section 16, and coupling 19, the filling is stopped and caps are applied to couplings 19 and 24 as indicated at "a" and "b" to prevent loss of any liquid. In emptying the tank, a hose to deliver compressed air from a suitable source is attached to the coupling 19 and another hose to serve as a conduit for gasoline from the tank 77 to another tank or other suitable container is attached to the coupling 24, the gasoline being forced out under air pressure through hose 57, axle section 17, and coupling 24. When all or nearly all of the liquid has been expelled, air escapes through coupling 24 and the operator knows definitely that the tank is empty. Then, if the caps "a" and "b" previously mentioned, are applied to the couplings 19 and 24 the tank 7 can be inflated through the valve 37 to whatever further extent is necessary after the loss of air pressure at 19 and 24. In that way the emptied tank can be hauled to the supply depot for refilling without any difficulty and with less wear and tear on the tank due to under-inflation thereof. In assembling the present construction, the assembly comprising axle 9 and fitting 38 can be assembled in the tank-tire 7 from the opposite ends, fitting 38 being entered through one end with one of the axle sections entered therein for connection with the other axle section, which for convenience may have been assembled on the other end of the tank-tire previously. It is a fairly easy matter in this assembling operation to get the two axle sections 16 and 17 connected together inside the fitting 38 by threading the part 45 in hole 46, the fitting 38 serving as a guide for the axle section 17, for example, if the axle section 16 has already been assembled in the fitting, to line up the screw 45 with hole 46. When the screw 45 is tightened in hole 46, there remains only the matter of assembling plate 31 in hole 67 and applying the outer plate 34 thereon to complete the assembly.

The rolling tank unit shown in FIGS. 5 and 6 is of the same construction in so far as the tank-tire 7 and axle 9 is concerned. However, a different arrangement is provided for filling and emptying the tank from a point near the front end of the draw-bar 8, the quickly disconnectible coupling 19' for air being on one side of the draw-bar and the quickly disconnectible coupling 24' for liquid on the other side, as appears in FIG. 6, coupling 19' being on the front end of a tube 68 extending forwardly from the left-hand half of tubular fork 10', and coupling 24' being on the front end of another tube 69 leading forwardly from the right-hand half of tubular fork 10'. The two halves of the fork 10' are cut off from communcation with one another, their inner end portions being sealed, as indicated at 70, and welded together, as indicated at 71, the left-hand half being placed in communication with axle section 16 and the right-hand half being placed in communication with axle section 17 through housings 22' and 27', respectively. The housings 22' and 27' have the inclined flanged lower ends 72 of arms 23' and 28' of fork 10' bolted onto the similarly inclined seats 73 provided on the housings, as indicated at 74, gaskets 75 being interposed between the parts to seal the joints, as most clearly appears in FIG. 6a. The trunnions 20' and 25', through which communication is established between the housings 22' and 27' with the axle sections 16 and 17, respectively, are mounted in ball bearings, as indicated at 21' in FIG. 6a, provided in the housings and with this construction there is also a need for a good sealing action at each of these bearings in the housings and for that purpose two O-rings are provided in connection with each of the trunnions, as indicated at 76 in FIG. 6a.

The operation of this modified or alternative construction is believed to be clear from the description of the operation of the other construction, the only difference with the present construction being that in filling the tank 7 with liquid through coupling 24' the operator can see at once when liquid begins to flow out of coupling 19', so that the filling operation can be stopped immediately and with minimum waste. In the emptying operation, the operator with this construction also has a similar advantage by reason of the closely spaced relationship of the two couplings 19' and 24' and, of course, the larger the tank 7, the more important this closely spaced relationship of the two couplings becomes, because with the other construction the couplings 19 and 24 are at opposite ends of the unit and in wider and bigger units they are necessarily spaced farther apart and the likelihood of wasting more fuel or other liquid becomes greater. A big advantage of this construction over the one of FIGS. 1-4 is that the liquid can be pumped out while the tank is rolling, thus enabling it to be used with mobile spraying equipment, for example, to supply the liquid to be sprayed, such as weed killing chemicals, germicides, and so forth.

It is believed the foregoing description conveys a good understanding of the objects and advantages of our invention. The appended claims have been drawn to cover all legitimate modifications and adaptations.

We claim:

1. A mobile reservoir tank for fluids comprising a hollow flexible body of normally cylindrical form, said body being substantially fabricated from resilient material so as to tend to return to said cylindrical form when distorted, an axle on the longitudinal axis of said cylinder through which the body is adapted to be filled and emptied, coupling means for the filling and emptying of said body communicating with said axle, an inverted U-frame in a substantially vertical plane having the lower ends of the arms thereof connected to the ends of said axle for towing, a substantially horizontal draw-bar rigidly connected to the middle of said U-frame at right angles thereto and carrying a coupler eye on its one end and a coupler hook on its other end, the axle having separate and independent passages provided therein extending therein from its opposite ends communicating with the interior of said body serving as fluid inlet and outlet passages, respectively, and housings on the ends of the arms of said U-frame connected in fluid-tight relationship with the ends of said axle for communication with said passages, the arms of said U-frame being tubular and serving as conduits for fluid communicating with said housings and leading to a common location spaced from the body for filling and emptying of said body, said coupling means communicating with said last mentioned conduits and being connected therewith at said location.

2. In a mobile tank for fluids comprising a hollow, flexible body of normally cylindrical form, said body being substantially fabricated from resilient material so as to tend to return to said cylindrical form when distorted, an axle extending through said body on the axis of rotation thereof comprising two coaxially aligned separate tubular axle sections, each fixed at its outer end portion to turn with said body, a tubular fitting swivelled on the inner end portions of said axle sections and held against endwise movement with respect thereto, means for sealing the inner ends of said axle sections, said inner end portions having openings provided therein, said fitting carrying inlet and outlet tubes extending in opposite directions radially with respect to the interior of said body to points adjacent the top and bottom thereof for filling and emptying said body, one of said tubes communicating with one of said axle sections through its opening and the other tube communicating with the other axle section through its opening, coupling means for the filling and emptying of said body communicating with said axle sections, means holding said fitting against turning with the axle, conduit means communicating with the outer ends of said axle sections and extending to a common location spaced from the body for the filling and emptying of said body, and a frame for towing said tank connected with the outer end portions of said axle sections, said frame having the conduit means carried thereon and including tubular portions at opposite ends of said axle through which said conduits communicate with the passages in the opposite ends of said axle.

3. In a mobile tank device for fluids comprising a hollow, flexible body of normally cylindrical form, said body being substantially fabricated from resilient material so as to tend to return to said cylindrical form when distorted, an axle extending through said body on the axis of rotation thereof, said axle comprising two coaxially arranged separate tubular sections closed at their inner ends having separate and independent passages, said sections extending into said body from its opposite ends and being mechanically interconnected at their inner ends to maintain their coaxial relationship and having flexible conduits communicating therewith and extending therefrom inside said body communicating with the interior of said body providing fluid inlet and outlet means therefor, respectively, coupling means for the filling and emptying of said body communicating with the respective passages, and a frame for towing said tank connected with the opposite ends of said axle and including two tubular portions communicating with the axle passages and said coupling means, respectively, said tubular portions extending to a common location on said frame spaced from the body where connection is made through said coupling means with tank filling and emptying means for the filling and emptying of said body.

4. In a mobile tank device for fluids comprising a hollow, flexible body of normally cylindrical form, said body being substantially fabricated from resilient material so as to tend to return to cylindrical form when distorted, an axle extending through said body on the axis of rotation thereof and fixed to turn with said body, said axle having separate and independent passages extending therein from its opposite ends communicating with the interior of said body providing fluid inlet and outlet means therefor, coupling means for the filling and emptying of said body communicating with the respective passages, a fitting inside said body swivelled on said axle and carrying inlet and outlet tubes extending in opposite directions radially with respect to said body to points adjacent the top and bottom thereof, one of said tubes communicating with one of said axle passages and the other tube communicating with the other axle passage, means holding said fitting against turning with the axle, bearings for said axle disposed adjacent its opposite ends and independent of said body, a frame for towing said tank and including two tubular portions carrying said bearings communicating with the axle passages and said coupling means, respectively, and conduits connected at one end with said tubular portions, respectively, and extending to a common location on said frame spaced from the body where connection is made through said coupling means with tank filling and emptying means for the filling and emptying of said body.

References Cited in the file of this patent

UNITED STATES PATENTS

| 1,432,296 | Mosel | Oct. 17, 1922 |
| 1,849,028 | Robinson | Mar. 8, 1932 |
| 2,548,190 | Arpin | Apr. 10, 1951 |
| 2,701,146 | Warren | Feb. 1, 1955 |
| 2,795,257 | Cunningham | June 11, 1957 |
| 2,802,541 | Albee | Aug. 13, 1957 |
| 2,824,592 | Neisler et al. | Feb. 25, 1958 |

FOREIGN PATENTS

| 101,076 | Australia | May 17, 1937 |
| 220,906 | Australia | Feb. 25, 1959 |

(Corresponding U.S. 2,952,468—Sept. 13, 1960)

| 657,921 | Great Britain | Sept. 26, 1951 |

OTHER REFERENCES

Publication: "Flight," issue of May 18, 1956; page 624.